June 12, 1951        R. B. TROSTEL        2,556,831
ORCHARD SPRAYING APPARATUS
Filed Jan. 9, 1947
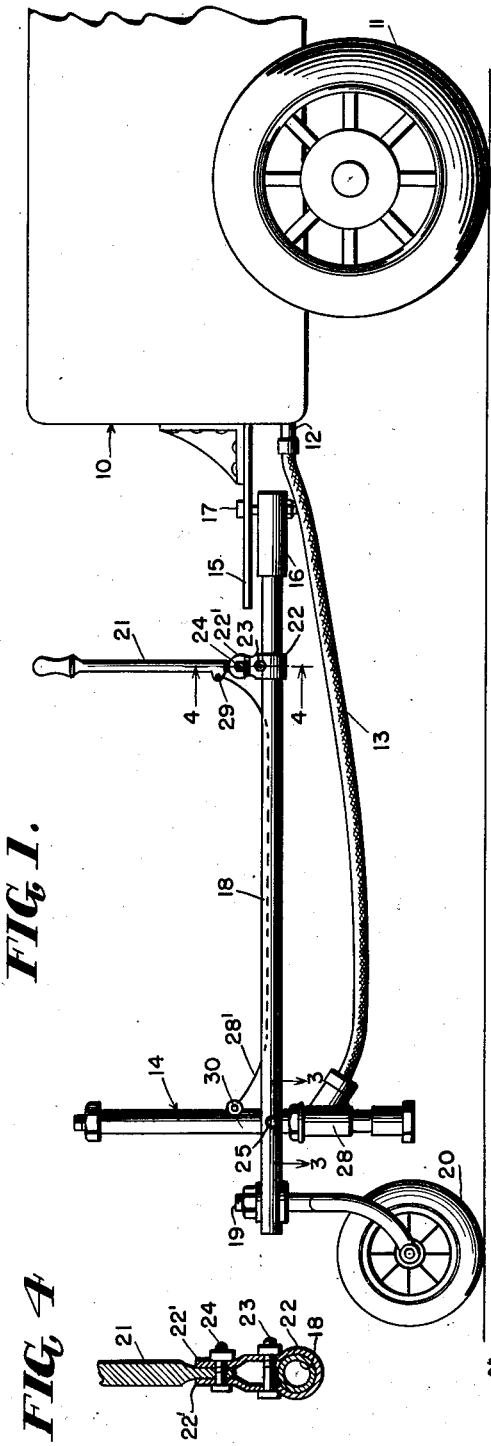
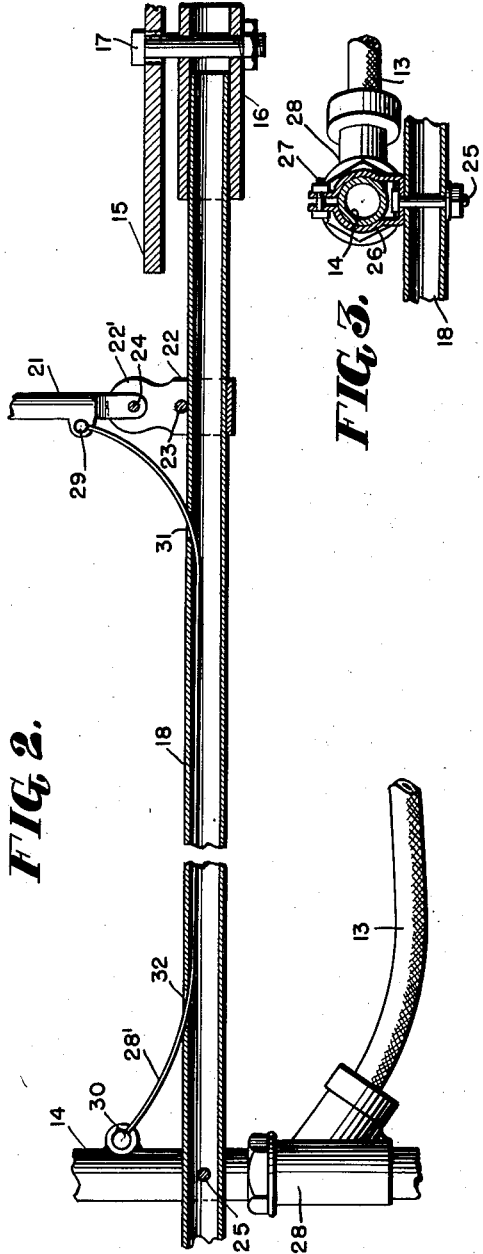
Inventor
*Richard B. Trostel*
By *Wilfred E. Lawson*
Attorney Patented June 12, 1951

2,556,831

UNITED STATES PATENT OFFICE 2,556,831

ORCHARD SPRAYING APPARATUS

Richard B. Trostel, Biglerville, Pa.

Application January 9, 1947, Serial No. 721,031

1 Claim. (Cl. 299—39)

This invention is directed generally to the class of plant husbandry and pertains particularly to an improved mechanism for spraying vegetation, more particularly fruit trees.

According to the present practice of spraying fruit trees there is employed a wheel supported tank structure carrying spraying solution together with a pumping mechanism to which is attached a spray gun. The attachment of the spray gun to the pump mechanism is in the form of a relatively long hose and an operator carries the spray gun and directs the spray upwardly into the foliage of the fruit trees beneath which he walks behind the wheel supported tank. Since poisonous solutions are used for controlling various types of parasites which infest fruit trees, this practice is very unhealthy for the person carrying the spray gun since he is continually exposed to a rain of the falling spray solution.

In the light of the foregoing it is an object of the present invention to provide an improved spray gun handling mechanism, by means of which the attendant can manipulate the spray gun from a remote point, thereby making it possible to project the spray upwardly into the branches of trees without himself being subjected to constant drenching from the spray solution.

Another object of the invention is to provide a spray gun handling mechanism which is designed for attachment to the rear of the wheel supported spray solution carrying tank, with means whereby an operator standing on a suitable platform forming a part of the tank, can move the spray gun back and forth across the path of travel of the apparatus and forwardly and backwardly as desired to project the spray upwardly at any desired angle, the spray gun being located at a substantial distance behind the operator so that the operator is not exposed to the spray solution.

A further and more specific object of the invention is to provide an attachment for a wheel supported power operated sprayer, comprising a relatively long arm which is attached at one end to the sprayer in a manner to be swung through an arc across the path of travel of the sprayer or rotated on its long axis, the rear end of the arm being suitably supported on a caster wheel, with a spray gun supported upon the rear end of such arm for oscillation in a forward and rearward direction and operatively coupled with a control stick located adjacent to the power sprayer whereby an attendant supported upon the power sprayer can manipulate the spray gun with a minimum of effort.

The invention will be best understood from a consideration of the following detailed description taken in connection with the accompanying drawing forming a part of the specification, with the understanding, however, that the invention is not confined to a strict conformity with the showing of the drawing but may be changed or modified so long as such changes or modifications mark no material departure from the salient features of the invention as expressed in the appended claim.

In the drawing:

Figure 1 is a view in side elevation of a sprayer mechanism constructed in accordance with the present invention and showing the same attached to the rear portion of a power take off sprayer.

Figure 2 is a vertical longitudinal section through the tubular arm and the connection of the arm with the platform.

Figure 3 is a horizontal section taken substantially on the line 3—3 of Figure 1.

Figure 4 is a vertical section taken substantially on the line 4—4 of Figure 1.

Referring now more particularly to the drawing there is shown diagrammatically in side elevation, a portion of the rear end of a wheel supported power sprayer of the type at present commonly employed in orchards. One well-known type of power sprayer in association with which the present invention may be used, is known as the "Bean tractor power take-off sprayer" wherein a tank structure 10 is supported upon two wheels 11 and is adapted to be connected to the rear end of a tractor and has a power take-off for connection with the tractor power supply unit, for the operation of a pressure pump, not shown, the outlet or discharge conduit of which is located at the rear of the tank structure as indicated at 12 for the attachment thereto of a hose line 13. This hose line 13 is of substantial length and in accordance with the present practice, as previously stated, it has attached to its other end a spray gun, here designated 14, which is, according to present practice, carried by an attendant.

In accordance with the present invention there is provided with the rear of the power sprayer tank, a platform 15 upon which an attendant may stand for the purpose of manipulating the spray gun which is supported in the manner about to be described.

Disposed beneath the platform 15 is a short metal tube or sleeve 16 which is attached to the platform by the vertical pin or bolt 17 in such a manner that it may be readily swung around the center of the bolt or may have slight up and down swinging movement. In other words the sleeve 16 is loosely connected with the bolt 17 which passes through the sleeve adjacent to one end, whereby the opposite end of the sleeve can be moved up and down freely and the sleeve can also be swung around the bolt.

Extending into the end of the sleeve remote from the supporting bolt 17, is an end of a relatively long tubular arm 18. The rear end of this arm 18 is connected by means of a vertical pivot 19, with a caster wheel unit 20.

Supported in a suitable manner upon the arm, adjacent to the platform 15, is a lever 21. The mounting for this lever is of a character to permit the lever to be moved or swung on a horizontal pivot extending transversely of the arm 18. While any suitable means may be employed for such a mounting, there is here shown a clamping band 22 encircling the arm 18 and having the upwardly extending ends 22' coupled together by a bolt 23. The lower end of the lever 21 is positioned between the spaced upwardly extending arms 22' above the bolt 23 and is pivotally held therebetween by the transverse pivot pin 24.

At the rear end of the arm 18 the spray gun 14 is attached and supported for rocking movement about the axis of a pivot 25 which extends transversely of the arm 18 in parallel relation with the pivot 24.

Any suitable means may be employed for attaching the spray gun 14 to the arm whereby the gun can be rocked on a transverse horizontal pivot but there is here shown a split collar 26 which is secured to one side of the arm 18 by a pivot pin, here shown as in the form of a bolt. The split collar 26 encircles the lower end of the gun 14 and is drawn tightly thereabout by the bolt 27 which passes through the spaced ends of the collar as illustrated. Thus the gun is firmly held by the collar and is supported on the pivot pin or bolt 25 so that it can be rocked forwardly and rearwardly on a horizontal axis.

As previously stated the split collar 26 connects with the gun adjacent to the lower end thereof where there is provided the coupling 28 with which the rear end of the hose 13 is connected below the arm 18.

The numeral 28' designates a flexible connecting rod which couples together the lever 21 and the gun 14. As shown one end of this flexible rod is pivotally attached at 29 to the lower end of the lever 21 upon the rear side thereof, while the opposite end of the flexible rod is pivotally attached as at 30 to the forward side of the gun 14. Thus it will be seen that by moving the lever 21 forwardly or backwardly a corresponding swinging movement will be given to the gun 14.

The rod connection between the lever and the gun may be a straight line connection substantially paralleling the arm 18 or the flexible rod 28' may be passed longitudinally through the tubular arm 18 in the manner shown so that it will be protected through the major portion of its length and also a rod of very light weight might be used by reason of the fact that the tubular arm will function as a guide to prevent buckling of the rod when a thrust is applied thereto by moving the lever 21 rearwardly.

As will be readily-apparent by following this latter procedure use may be made of heavy weight wire which will pass from the lever 21 into the tubular arm 18 through an aperture 31 located relatively closely to the lever and pass out of the tubular arm through a corresponding aperture 32 located relatively closely to the forward side of the gun 14.

From the foregoing it will be readily apparent that by the use of the apparatus herein disclosed an attendant standing on the platform 15 can swing the lever 21 laterally in opposite directions to impart turning motions to the tubular arm 18 and thereby swing the gun 14 likewise across the path of travel of the sprayer mechanism in a wide arc so as to locate the gun nozzle beneath a particular tree, when the sprayer is drawn along between two adjacent rows of trees. At the same time the gun can be rocked on the pivot 24 by the attendant swinging the lever 21 fore and aft regardless of the angular disposition of the gun 14 to either side of its normal vertical position, as shown in Figures 1 and 2, to assure of a maximum dispersal of the spray discharged from the gun.

Detachment of the device from the wheeled power sprayer S can be easily effected by disconnecting the hose 13 from the outlet 12 whereupon the forward end of the tubular 18 can be slipped rearwardly and out of the sleeve 16. When the hose 13 is connected between the coupling 28 of the gun and the outlet 12 will function to hold the arm against rearward movement to an extent that the forward end of the arm cannot escape from the sleeve 16.

I claim:

In a spraying apparatus, a wheeled tank having a rearwardly directed outlet, a platform mounted on the rear end of said tank above said outlet, a tubular sleeve pivotally supported from and immediately beneath said platform for lateral swinging movements, an elongated tubular arm having one of its ends slidably engaged in said sleeve, a caster wheel unit supporting the other end of said arm, means pivoting the said other end of said arm to the upper end of said caster wheel unit, an upwardly directed spray gun pivotally mounted on said arm adjacent the said other end thereof, a flexible hose connecting said outlet with said gun, a hand lever, a pivot mounting for said lever clamped on said arm adjacent the rear edge of said platform, and a flexible member having a major portion of its intermediate length housed within said arm with its ends passing outwardly through openings in the arm and connecting with said lever and said gun, said lever being operable by an attendant on said platform to swing said arm laterally in opposite directions to positions said gun to one or the other sides of the path of travel of said tank and in fore and aft directions to likewise rock the gun and thereby affect maximum dispersal of the spray from the gun.

RICHARD B. TROSTEL.

REFERENCES CITED

The following references are of record in the file of this patent:

UNITED STATES PATENTS

| Number | Name | Date |
|---|---|---|
| 963,199 | Alden | July 5, 1910 |
| 2,132,727 | Foote | Oct. 11, 1938 |
| 2,192,433 | Cornielson | Mar. 5, 1940 |
| 2,226,136 | Parker | Dec. 24, 1940 |
| 2,297,110 | Parker | Sept. 29, 1942 |